United States Patent
Boudreaux, Jr. et al.

(10) Patent No.: US 6,489,755 B1
(45) Date of Patent: Dec. 3, 2002

(54) ACTIVE RIPPLE AND NOISE FILTER FOR TELECOMMUNICATION EQUIPMENT POWERING

(75) Inventors: Ralph R. Boudreaux, Jr., Madison, AL (US); Steven M. Robinson, Madison, AL (US); John S. McGary, Petersburg, TN (US)

(73) Assignee: Adtran, Inc., Huntsville, AL (US)

( * ) Notice: Subject to any disclaimer, the term of this patent is extended or adjusted under 35 U.S.C. 154(b) by 53 days.

(21) Appl. No.: 09/663,904

(22) Filed: Sep. 18, 2000

(51) Int. Cl.[7] .............................. G05F 1/40; H02M 1/12
(52) U.S. Cl. .......................................... 323/282; 363/46
(58) Field of Search ................................. 323/282, 259, 323/303, 284, 286; 363/46, 78; 379/378, 379, 413

(56) References Cited

U.S. PATENT DOCUMENTS

| | | | |
|---|---|---|---|
| 3,751,667 A | * | 8/1973 | Quittner ..................... 250/351 |
| 4,327,319 A | | 4/1982 | Swisher ..................... 323/303 |
| 4,424,593 A | * | 1/1984 | Kahn ......................... 455/47 |
| 4,431,874 A | * | 2/1984 | Zobel et al. ................. 379/405 |
| 4,540,853 A | * | 9/1985 | Albouy ........................ 379/378 |
| 4,570,034 A | * | 2/1986 | Serrano ....................... 379/718 |
| 4,710,861 A | | 12/1987 | Kanner ........................ 363/46 |
| 4,712,233 A | * | 12/1987 | Kuo ............................. 379/386 |
| 4,764,956 A | * | 8/1988 | Rosch et al. ................. 379/413 |
| 4,594,648 A | | 6/1989 | Gallios ........................ 363/46 |
| 4,873,602 A | | 10/1989 | Wilkinson .................... 361/78 |
| 5,668,464 A | | 9/1997 | Krein et al. .................. 323/259 |
| 5,740,241 A | | 4/1998 | Koenig et al. ................ 379/399 |
| 5,877,653 A | * | 3/1999 | Kim et al. .................... 330/149 |
| 5,878,133 A | * | 3/1999 | Zhou et al. ................... 379/413 |
| 6,026,126 A | | 2/2000 | Gaetano ....................... 375/296 |

* cited by examiner

*Primary Examiner*—Rajnikant B. Patel
(74) *Attorney, Agent, or Firm*—Allen, Dyer, Doppelt, Milbrath & Gilchrist, P.A.

(57) ABSTRACT

An active tracking filter reduces low frequency noise (such as a 20 Hz ringing signal) riding on a DC voltage (e.g., on the order of (−40 VDC) applied to a load such as a subscriber line interface circuit (SLIC). A controllable impedance device, such as a FET operating in its linear range, is coupled in circuit between a source of the DC voltage and the load. A low frequency voltage average detector circuit senses the average low frequency variation of the DC voltage. An output voltage sensor senses a DC output voltage at the output of the controllable impedance. A differential error amplifier circuit has a first input coupled to the low frequency voltage average detector circuit, a second input coupled to the output voltage sensor, and an output coupled to a control terminal of the controlled impedance device. The error amplifier controls the drive to the controllable impedance device such that the voltage drop thereacross reduces the low frequency variation of the DC voltage by an amount sufficient to accommodate the maximum amplitude of the noise, and thereby provide a DC output voltage to the load in which the unwanted low frequency noise has been effectively removed.

25 Claims, 4 Drawing Sheets

ACTIVE RIPPLE AND NOISE FILTER FOR TELECOMMUNICATION EQUIPMENT POWERING

FIELD OF THE INVENTION

The present invention relates in general to communication circuits and components, and is particularly directed to a new and improved active noise (ripple) filter circuit, that is operative to effectively reduce or cancel unwanted, relatively low frequency AC component variations (such as a 20 Hz ringing voltage signal) riding on a DC voltage supplied over (tip/ring) wireline conductors to a load such as, but not limited to, a subscriber line interface circuit (SLIC).

BACKGROUND OF THE INVENTION

As a result of continuing improvements to and miniaturization of telecommunication equipment and components therefor, unwanted variations (e.g. noise and ripple) on the voltage supply rails powering various signaling components has increased. As a non-limiting example, a significant reduction in size and improvement in the efficiency of circuitry employed to ring a POTS (plain old telephone service) line can be attained by using a four-quadrant ringing signal generator, which recycles energy back to the −48V supply, rather than simply dissipating that energy (in the form of heat). Unfortunately, this energy recovery process causes modulation of the (−48V) DC voltage supply rails at frequencies down to less than a few Hertz (depending upon ringing frequency, cadence, and sequencing). Since the DC power source also supplies power to one or more SLICs, ripple can cause compatibility problems with some devices.

For example, the circuitry configurations of relatively inexpensive, low end SLICs are not able to adequately attenuate excessive ripple, so that some amount of ripple will still be transmitted to the POTS loop. In addition, ripple on tip and ring can prevent inexpensive Caller-ID devices from receiving on-hook data transmissions. Although filtering ripple and noise using passive components, such as resistors, capacitors and inductors, would appear to be a logical answer, it is impractical due to the very low frequencies involved.

Another potentially viable solution to ripple cancellation is to use a linear voltage regulator. However, to be employable in most telecommunication industry applications, a linear voltage regulator would be required to operate at up to −70 VDC and, as a result of thermal considerations, would have to track the input, rather than providing a prescribed reference voltage. For example, the range of a −48 VDC supply is typically on the order of −40 VDC to −56 VDC, depending on the battery state of charge. In addition, a linear voltage regulator must be provided with some amount of voltage rail 'headroom', in order to be able to attenuate the ripple. In some cases, even a low dropout regulator would require on the order of one volt of headroom due to excessive amounts of ripple. As a result, a fixed regulator would typically be adjusted to provide −39 VDC. Although this regulated voltage is sufficient for the input voltage range, at a high line voltage power dissipation would be unacceptable (on the order of twelve watts), since the loop current required by multiple (e.g., 24) POTS lines can exceed 700 mA.

SUMMARY OF THE INVENTION

In accordance with the present invention, the problem of low frequency ripple noise riding on a DC voltage to be delivered to a load is effectively obviated without the attendant shortcomings of strictly passive or voltage regulator solutions, discussed above, by an active tracking filter that is operative to sense the average value of low frequency variation of the DC voltage, and then controllably reduce that average voltage value by a voltage drop that is sufficient to accommodate the maximum amplitude of the unwanted AC (ripple) component.

Pursuant to a non-limiting application example of a telecommunication circuit application of the invention, the DC voltage may be supplied from an upstream (e,.g., central office-resident) DC voltage source to respective tip and ring conductors of a telecommunication wireline pair, by means of one or more subscriber line interface circuits (SLICs). A low frequency voltage average detector circuit (such as a low pass filter) is coupled across the power input conductors upstream of the SLIC(s). This detector supplies an output voltage representative of the average value of the low frequency composite voltage (DC source voltage plus ripple) on the wireline pair to a first input of an error amplifier of a ripple voltage cancellation circuit that is coupled between the DC voltage source and the load (SLIC). The error amplifier has a second input coupled to receive the output voltage produced by an output voltage sensor coupled across the power input conductors feeding the SLIC(s).

The output of the error amplifier is coupled to the control terminal of a controlled impedance installed in the current flow path of one of the conductors of the DC source. As a non-limiting example, the controlled impedance may comprise a controllable semiconductor device, such as a field effect transistor (FET), having its source-drain path installed in the wireline path of interest. The FET is biased to operate in its linear range, and produces a controlled drain-source voltage drop thereacross in proportion to applied gate voltage.

The parameters of the circuit are defined such that the value of the controlled voltage drop across the FET accommodates the maximum amplitude of the unwanted AC/ripple component of the DC voltage. Namely, the error amplifier controls the FET, such that the output voltage applied from its downstream end effectively corresponds to the average value of the low frequency DC voltage sensed by the average detector, minus a small offset or 'headroom' voltage associated with and attenuating the ripple.

Each of the average detector and output voltage sensor includes a respective resistor-configured voltage divider to scale down the input and output voltages. In a practical circuit, by appropriate choice of the values of the voltage divider resistors, the adjusted output voltage at the output of the controlled FET may be set at a value that is slightly less than the low frequency average value of the input voltage. For an average input voltage value on the order −40V, the resulting output voltage may be on the order of −39V, which provides sufficient headroom for attenuating unwanted AC ripple under normal operating conditions.

Because of the high voltages involved in telecommunication wireline applications, implementing the error amplifier with a standard operational amplifier would mandate the use of a relatively cumbersome powering circuit. This potential problem is readily obviated by employing discrete components to emulate the function of an operational amplifier. The error amplifier may be configured of a differentially coupled pair of bipolar transistors, which controllably steer an emitter coupled bias current to either the gate of the FET or to the FET's output terminal. When the output voltage increases incrementally, the current is steered so as to increase the gate-source voltage of the FET and thereby increase the conductivity of the FET. As a result, its output voltage is reduced. Conversely, when the value of the output voltage is incrementally decreased, the current is steered so as to decrease the gate-source voltage of the FET and thereby reduce its conductivity, and increase the output voltage.

Protection diodes may be incorporated into the error amplifier to protect the base-emitter junctions of its differentially coupled transistor pair during power-up and transients. A protection diode may be coupled with the low pass filter circuit to reset the filter capacitor during anomalies in the power supply voltage or power cycling. To protect the FET gate during transients, a Zener diode may be coupled across its gate and source.

Current limiting protection may also be provided by installing a supply current sense resistor in the wireline path through the FET. An additional by-pass transistor may be connected with its base-emitter terminals coupled across the sense resistor, and its collector coupled to the gate of the FET. As the sensed voltage approaches the Vbe threshold of the by-pass transistor, that transistor begins to turn on and divert error amplifier output current around the FET. The collector of the sense transistor may additionally be coupled to the base of a capacitor-discharging transistor for the low pass filter of the average detector. This allows the sense transistor to control the FET indirectly by discharging the low pass filter capacitor (through the capacitor-discharging transistor).

DETAILED DESCRIPTION

Figure 1:
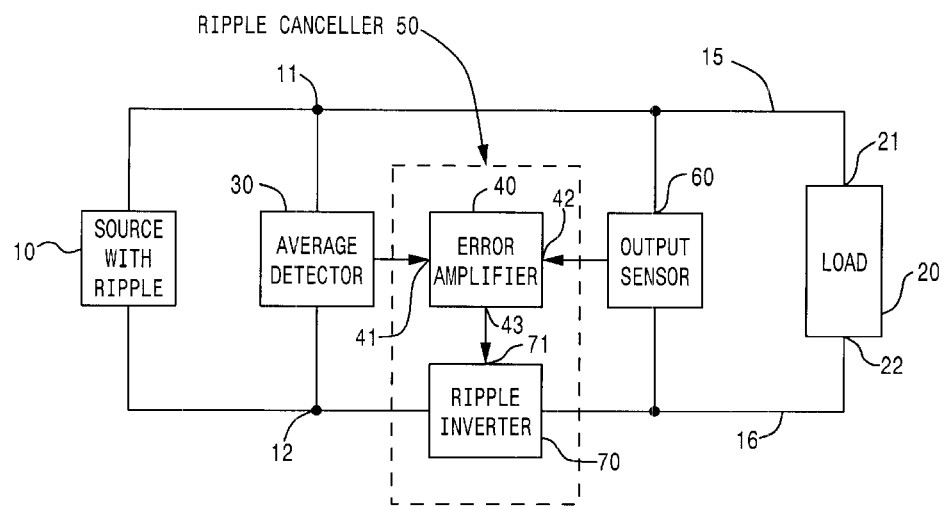
FIG. 1 diagrammatically illustrated the architecture of the active line power ripple noise filter of the present invention.

The basic architecture of the active line power ripple noise filter of the present invention is diagrammatically illustrated in FIG. 1 as comprising first and second input terminals 11 and 12, which are adapted to be coupled to a source 10 of a DC input voltage that is to be applied across terminals 21 and 22 of a load 20. As pointed out above, in accordance with the non-limiting example of a telecommunication application of the invention, the input terminals 11 and 12 may be coupled to respective tip and ring conductors and 16 of a telecommunication wireline pair through which DC power is to be coupled to corresponding power input terminals 21 and 22 of a subscriber line interface circuit (SLIC) as the load 20.

In addition to the providing desired DC voltage of interest (e.g. −48 VDC), the source of DC voltage 10 has an associated unwanted AC or ripple component (such as that associated with a standard 20 Hz ringing signal) that is to be effectively attenuated or removed from the wireline conductors feeding load (SLIC) 20. In order to remove this unwanted component from the composite voltage (DC plus AC ripple component), a low frequency voltage average detector circuit 30 is coupled across the input terminals 11 and 12. The average detector circuit 30 is operative to produce an output voltage representative of the average value of the low frequency composite voltage on the line. The average value representative output voltage produced by the average detector circuit 30 is applied to a first input 41 of an error amplifier 40 within a ripple voltage cancellation circuit 50 that is coupled in circuit between the source 10 and the load 20. The error amplifier 40 has a second input 42 coupled to receive the output voltage produced by an output voltage sensor 60 coupled across the line to which the terminals 21 and 22 of the load 20 are connected.

Figure 2:
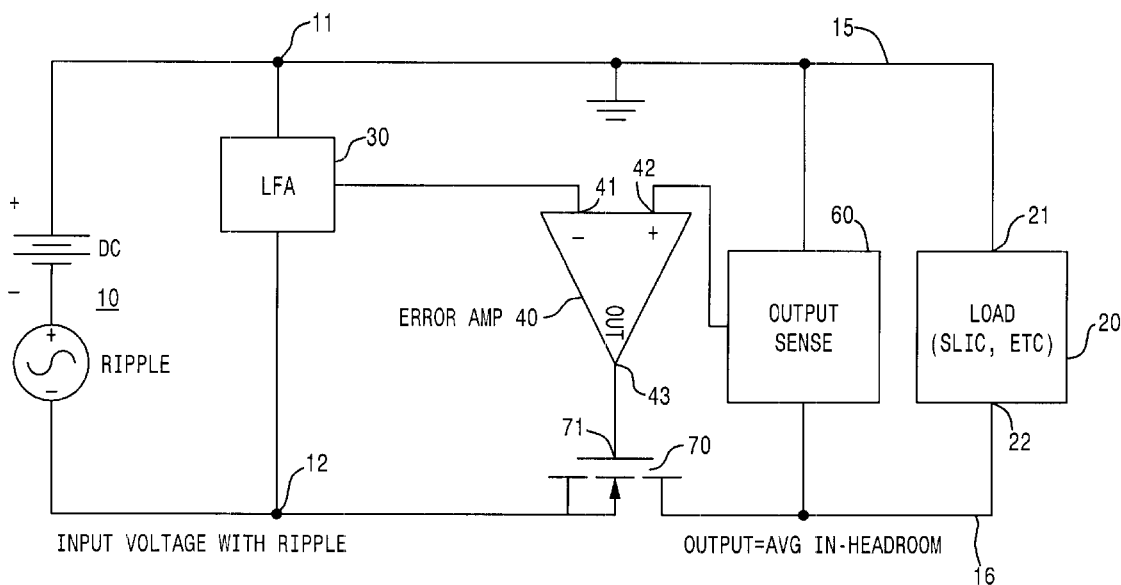
FIG. 2 is a more detailed illustration of the active line power ripple noise filter of FIG. 1.

As shown in FIG. 2, and as will be described below with reference to the circuit implementations of FIGS. 3–7, error amplifier 40 may be configured as a differential amplifier circuit. Here, the conductor 15 is coupled to a reference potential terminal such as ground (GND). The error amplifier 40 has its output terminal 43 coupled to the control terminal 71 of a ripple inverter block or controlled impedance 70 installed in the current flow path of one of the conductors (e.g., the conductor 16) of the telecommunication wireline pair. The controlled impedance 70 may comprise a controllable semiconductor device, such as a field effect transistor (FET), having its source-drain path adapted to be coupled in one of the wireline conductor paths between the power supply 10 and the load 20, and its gate terminal serving as the control terminal 71 and being coupled to the output terminal 43 of the error amplifier 40.

As such, the FET 70 is biased to operate in its linear range, so as to produce a controlled drain-source impedance and thereby an associated drain-source voltage drop thereacross in proportion to the value of applied gate voltage. The parameters of the circuit are defined such that the value of the controlled voltage drop across the controlled impedance 70 is sufficient to accommodate the maximum amplitude of the unwanted AC/ripple component of the DC voltage. Namely, the error amplifier 40 drives the controlled impedance 70, so that the output voltage applied from the downstream end of its controlled impedance (e.g., source-drain) path to its associated wireline conductor 16 effectively corresponds to the average value of the low frequency DC voltage sensed by the average detector circuit 30, minus small offset or 'headroom' voltage, attenuating the ripple component.

Figure 3:
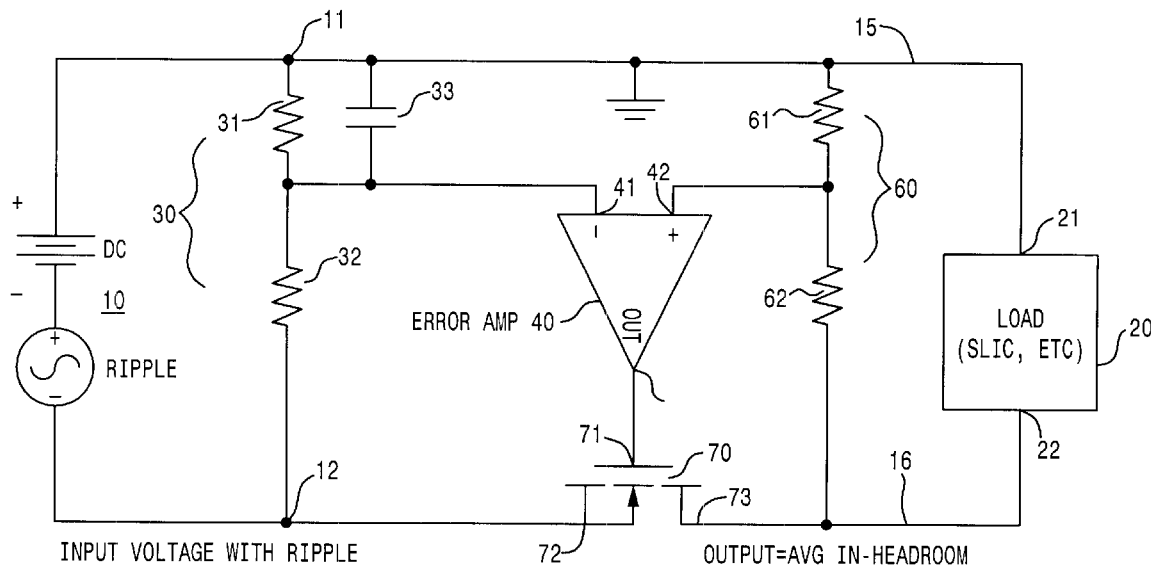
FIG. 3 diagrammatically illustrates the circuit of FIG. 2 in greater detail, showing non-limiting examples of circuit components for implementing the average detector circuit and output voltage sensor.

FIG. 3 diagrammatically illustrates the circuit of FIG. 2 in greater detail showing non-limiting examples of circuit components for implementing the average detector circuit 30 and the output voltage sensor 60. In particular, the low frequency voltage average detector circuit 30 comprises a low pass filter network comprising a voltage divider including resistors 31 and 32 coupled in series between conductors 11 and 12, and a capacitor 33 coupled in parallel with resistor 31. It should be noted the average voltage detector 30 may be configured of components other than and/or in addition to those of the illustrated implementation, such as but not limited to a higher order filter containing inductors, capacitors, resistors, and/or operational amplifier components. The illustrated resistor-capacitor embodiment provides a practical implementation in terms of cost and performance in current day SLIC applications. The inclusion of a voltage divider serves to scale down the input voltage so as to reduce the voltage requirements of the capacitor 33.

The output voltage sensor 60 is configured as a voltage divider of resistors 61 and 62 coupled in series between conductors 15 and 16, and being operative to scale down the output voltage and provide an offset reference input to the second input 42 of the error amplifier 40. In terms of a practical circuit, if the values of resistors 31, 32 and 61 are the same and slightly larger than (e.g., 5%) the value of resistor 62, namely, $R_{31}=R_{32}=R_{61}=1.05R_{62}$, then the adjusted output voltage (relative to GND) provided at the output terminal 73 of controlled FET 70 will be equal to 0.976 times the low frequency average value of the input voltage at its input terminal 72. For an average input voltage value of −40V, the resulting output voltage is −39V, which provides sufficient headroom for attenuating the unwanted AC ripple under normal operating conditions.

Figure 4:
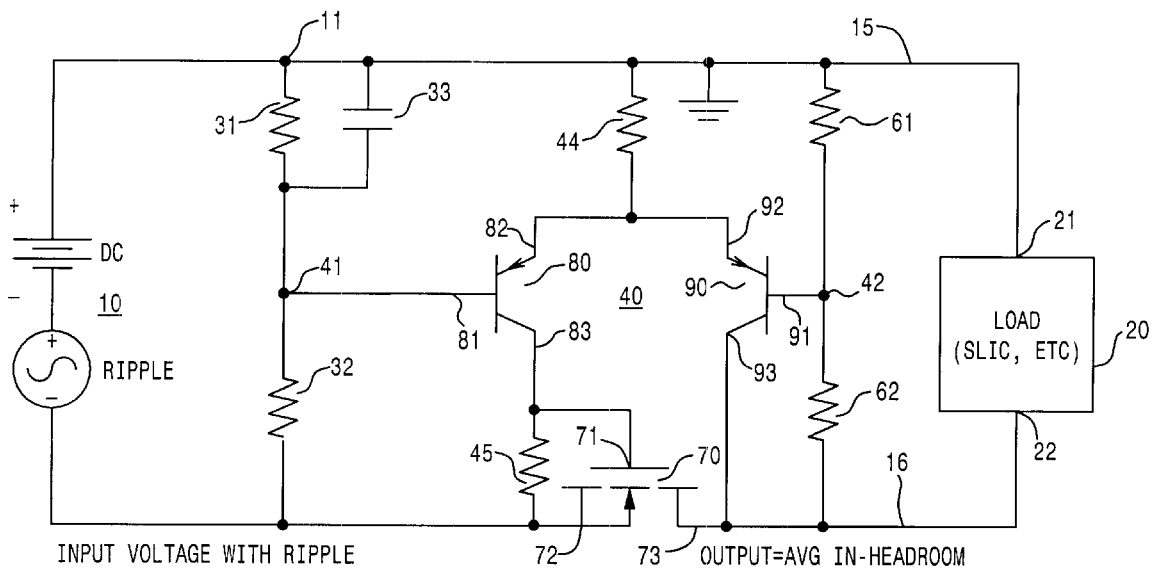
FIG. 4 diagrammatically shows a practical implementation of the circuit of FIG. 2.

Because of the high voltages typically encountered in telecommunication wireline applications, implementing the error amplifier 40 with a standard operational amplifier requires a relatively cumbersome powering circuit. FIG. 4 diagrammatically shows a relatively practical solution which employs discrete components to emulate the function of an operational amplifier. In particular, the error amplifier 40 is configured of a differentially coupled pair of (PNP) bipolar transistors 80 and 90 having their emitters 82 and 92 coupled in common through a bias resistor 44 to GND. Although bipolar components are shown, it is to be understood that the invention is not limited thereto, but also may be implemented using alternative equivalent circuit devices, such as field effect transistors (FETs), for example.

Transistor 80 has its base 81 coupled to the first error amplifier input terminal 41, and its collector 83 coupled directly to the gate 71 of FET 70, and also through a load resistor 45 to the input terminal 72 of FET 70. Transistor 90 has its base 91 coupled to the second error amplifier input terminal 42, and its collector 93 coupled to the output terminal 73 of the controlled FET 70. In this configuration, the differentially configured transistor pair 80-90 steer the bias current flowing through bias resistor 44 to either the gate 71 of FET 70 or to the FET's output terminal 73.

In operation, as the value of the voltage at the output terminal 70 of the controlled impedance (FET) 73 increases incrementally (in the present example, becomes less negative), transistor 80 steers more current through its load resistor 45, so as to increase the gate-source voltage of the FET 70 and thereby increase the conductivity (decrease the impedance) of FET 70. As a result, the voltage at output terminal 73 is reduced (becomes more negative in the present example). Conversely, when the value of the voltage at output terminal 73 is incrementally decreased (becomes more negative), the transistor 80 steers less current through its load resistor 45, so as to decrease the gate-source voltage of FET 70 and thereby reduce the conductivity of (increase the voltage drop across) FET 70. As a result, the output voltage at terminal 73 is increased (becomes less negative in the present example). In addition to its relatively simple implementation, with practical part selection, the performance of the embodiment of FIG. 4 has been measured to achieve greater than 30 dB ripple attenuation at 5 Hz, greater than 70 dB at 120Hz, and in excess of 90 dB above 5 KHz.

Figure 5:
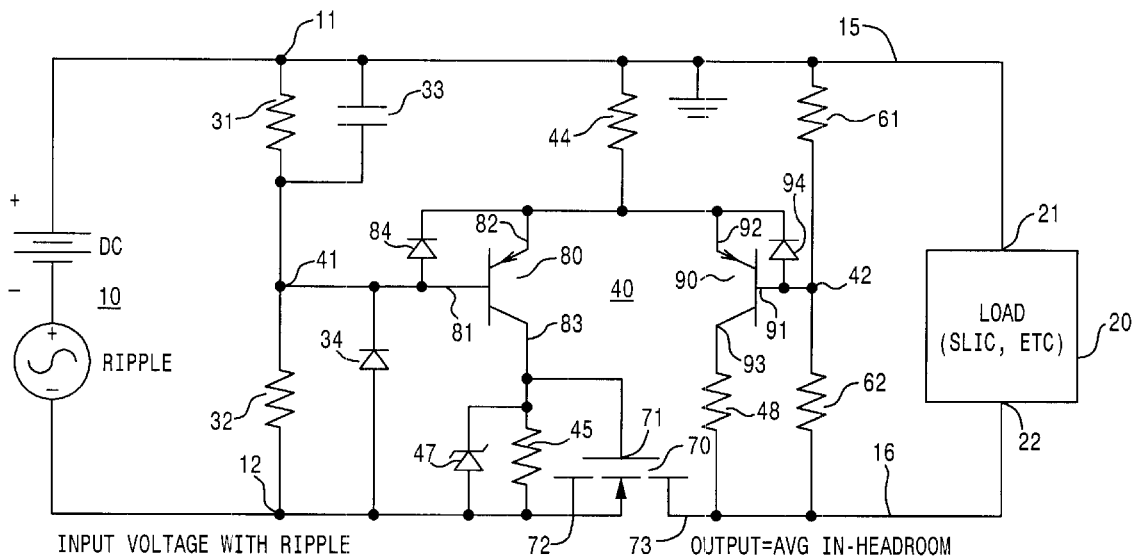
FIG. 5 shows an augmentation of the circuitry implementation of FIG. 4 to incorporate protection diodes.

FIG. 5 shows an augmentation of the circuitry implementation of FIG. 4 to incorporate protection diodes into each of the average detector circuit 30 and differential amplifier 40. In particular, protection diodes 84 and 94 are coupled across the base-emitter terminals of transistors 80 and 90, respectively, to protect their base-emitter junctions during power-up and transients. A diode 34 is coupled across resistor 32, and serves to reset the capacitor 33 during anomalies in the power supply voltage or power cycling. To protect the FET gate during transients, Zener diode 47 is coupled across the gate 71 and source 72 of the FET 70. A further load resistor 48 is coupled between the collector 83 of transistor 80 and output terminal 73, to balance the collector-emitter voltages of the two transistors 80 and 90 for improved performance. The diode 34 may be omitted, since it is parallel with diode 47 and the collector-base junction of transistor 80.

Figure 6:
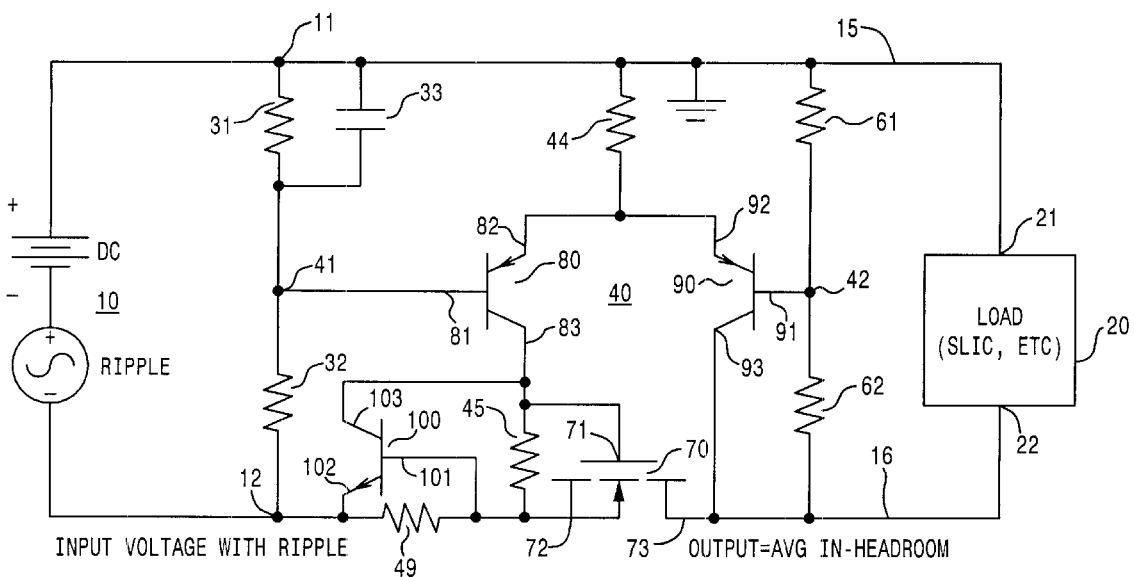
FIGS. 6 and 7 show enhancements to the circuitry implementation of FIG. 5 to include current limiting protection.
Figure 7:
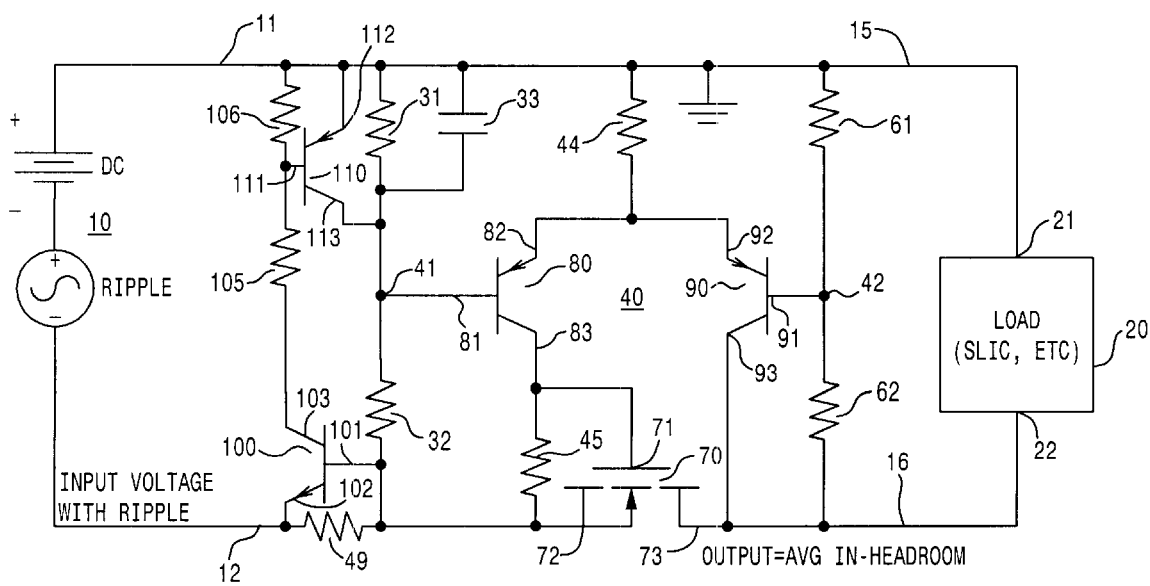

FIGS. 6 and 7 shows further enhancements to the circuitry implementation of FIG. 5 that add current limiting protection. In order to avoid cluttering the drawings, the auxiliary diode and resistor components of FIG. 5 described above, and which are preferably employed together with the additional components of FIGS. 6 and 7, are not shown in FIG. 5.

In the circuit implementation of FIG. 6, a supply current sense resistor 49 is installed in the wireline path 16. An additional by-pass or shunt transistor 100 has its base-emitter terminals 101–102 coupled across the sense resistor 49. The collector 103 of by-pass transistor 100 is coupled to the gate 71 of the FET. In operation, the by-pass transistor 100 monitors the voltage drop across the sense resistor 49. As the sensed voltage approaches the Vbe threshold of the by-pass transistor 100, transistor 100 begins to turn on and divert or by-pass collector current from the transistor 80 around load resistor 48 and FET 70.

In the circuit implementation of FIG. 7, the collector 103 of transistor 100 is additionally coupled through a resistor 105 to the base 111 of a capacitor discharging transistor 110 and to a base-bias resistor 106 that is referenced to GND. Transistor 110 has its emitter 112 coupled to GND and its collector 113 coupled to the first input terminal 41 of the differential amplifier transistor pair 80/90. In the embodiment of FIG. 7, transistor 100 serves to control FET 70 indirectly by discharging the capacitor 33 through the transistor 110.

It may be observed that once the current limit is reached, both of the circuits of FIGS. 6 and 7 act as constant current sources. The embodiment of FIG. 7, however, has a delayed recovery time from current limit (soft restart) as capacitor 33 is recharged. It may be noted that transistor 100 may be replaced in either embodiment by an operational amplifier for more precise current limiting. Also, voltage divider resistor 32 may be connected to either end of sense resistor 49. Connecting resistor 32 to the source terminal 72 of FET 70, as shown, is preferred, since the voltage drop across sense resistor 49 will be compensated by the feedback network. In addition, a relatively small valued base feed resistor may be coupled in series with the base of transistor 100 to protect transistor 100 during extreme transients.

As will be appreciated from the foregoing description, the problem of low frequency ripple noise on a DC voltage, such as but not limited to the presence of a 20 Hz ringing signal riding on a telecommunication wireline supply voltage, is effectively obviated by the active tracking filter of the present invention, which senses the average value of low frequency variation of the DC voltage, and then controllably reduces that average voltage value by a voltage drop sufficient to accommodate the maximum amplitude of the unwanted ripple component.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and the art.

What is claimed is:

1. A circuit for effectively reducing an unwanted AC component variation of a DC voltage to be applied to a load comprising:
   a detector coupled to sense the average voltage value of low frequency variation of said DC voltage; and
   a controllable attenuator coupled in circuit between a source of said DC voltage and said load, and being operative to controllably attenuate the average voltage value sensed by said detector by an amount that is effective to provide a DC output voltage for application to said load in which said unwanted AC component variation has been effectively removed.

2. The circuit according to claim 1, wherein said controllable attenuator comprises a controlled impedance adapted to be coupled between said source of DC voltage and said load, and being operative to provide a controlled voltage drop thereacross based upon said average voltage value sensed by said detector, that accommodates a maximum amplitude of said unwanted AC component.

3. The circuit according to claim 1, wherein said load comprises a subscriber line interface circuit (SLIC) coupled to tip and ring conductors of a telecommunication wireline pair to which said DC voltage is applied, and wherein said unwanted AC component includes a ringing signal.

4. The circuit according to claim 2, wherein said controlled impedance has a current flow path therethrough adapted to be coupled between said source of DC voltage and said load, and a control terminal for controlling the impedance of said current flow path, and an error amplifier circuit having an output terminal coupled to said control terminal of said controlled impedance, a first input coupled to said detector, and a second input coupled to said DC output voltage.

5. The circuit according to claim 4, wherein said error amplifier circuit includes a differentially coupled pair of first and second transistors having current inputs thereof coupled to a reference potential terminal, said first transistor having a control terminal thereof coupled to said detector, and an output coupled to the control terminal of said controlled impedance, said second transistor having a control terminal thereof coupled to an output voltage sensor that is configured to sense said DC output voltage, and an output coupled in circuit with the output of said controlled impedance.

6. The circuit according to claim 5, further including a current limiting circuit coupled with said controlled impedance and being operative to controllably limit drive to said control terminal thereof in accordance with current flow between said source of said DC voltage and said load.

7. The circuit according to claim 5, wherein said detector comprises a low pass filter coupled in circuit with a first voltage divider and being operative couple a scaled version of said average voltage value of low frequency variation of said DC voltage to said control terminal of said first transistor, and wherein said output voltage sensor includes a second voltage divider that is operative couple a scaled version of said DC output voltage to said control terminal of said second transistor.

8. The circuit according to claim 7, further including a current limiting circuit coupled with said controlled impedance and being operative to controllably limit drive to said control terminal thereof in accordance with current flow between said source of said DC voltage and said load.

9. The circuit according to claim 8, wherein said low pass filter includes a capacitor, and further including a controlled discharge device coupled in circuit with said capacitor and being operative to controllably discharge said capacitor in accordance with said current flow between said source of said DC voltage and said load.

10. A tracking filter for effectively reducing unwanted low frequency noise riding on a DC voltage to be applied to a load comprising:
    a controllable impedance device adapted to be coupled in circuit between a source of said DC voltage and said load, and being operative to provide a controlled voltage drop thereacross;
    a low frequency voltage average detector circuit which is adapted to sense the average low frequency variation of said DC voltage;
    an output voltage sensor adapted to sense a DC output voltage at the output of said controllable impedance; and
    an error amplifier circuit having a first input coupled to said low frequency voltage average detector circuit, a second input coupled to said output voltage sensor, and an output coupled to said control terminal of said controlled impedance device, and being operative to control the drive input to said controllable impedance device such that the voltage drop thereacross reduces the average low frequency variation of said DC voltage by an amount that is sufficient to accommodate the maximum amplitude of the unwanted low frequency noise, and thereby provide a DC output voltage for application to said load in which said unwanted low frequency noise has been effectively removed.

11. The tracking filter according to claim 10, wherein said load comprises a subscriber line interface circuit (SLIC) coupled to tip and ring conductors of a telecommunication wireline pair to which said DC voltage is applied, and wherein said unwanted low frequency noise includes a ringing signal.

12. The tracking filter according to claim 10, wherein said error amplifier circuit includes a differentially coupled pair of first and second transistors having current inputs thereof coupled to a reference potential terminal, said first transistor having a control terminal thereof coupled to said low frequency voltage average detector circuit, and an output coupled to the control terminal of said controlled impedance device, said second transistor having a control terminal thereof coupled to said output voltage sensor and an output coupled in circuit with the output of said controlled impedance.

13. The tracking filter according to claim 12, further including a current limiting circuit coupled with said controlled impedance device and being operative to controllably limit drive to said control terminal thereof in accordance with current flow between said source of said DC voltage and said load.

14. The tracking filter according to claim 13, wherein said low frequency voltage average detector circuit includes a low pass filter coupled in circuit with a first voltage divider and being operative couple a scaled version of said average voltage value of low frequency variation of said DC voltage to said control terminal of said first transistor, and wherein said output voltage sensor includes a second voltage divider that is operative couple a scaled version of said DC output voltage to said control terminal of said second transistor.

15. The tracking filter according to claim 14, further including a current limiting circuit coupled with said controlled impedance and being operative to controllably limit drive to said control terminal thereof in accordance with current flow between said source of said DC voltage and said load.

16. The tracking filter according to claim 15, wherein said low pass filter includes a capacitor, and further including a controlled discharge device coupled in circuit with said capacitor and being operative to controllably discharge said capacitor in accordance with said current flow between said source of said DC voltage and said load.

17. An apparatus comprising:
input terminals to which a DC power supply voltage is applied from a DC power source for powering a signaling circuit;
output terminals that power said signaling circuit with a filtered version of said DC power supply voltage; and
a filter arrangement that is operative to effectively remove an unwanted AC component variation of said DC power supply voltage applied to said input terminals and produce said filtered version of said DC power supply voltage that powers said signaling circuit, said filter arrangement including
a detector coupled to said input terminals and being operative to sense the average voltage value of low frequency variation of said DC power supply voltage, and
a controllable attenuator coupled between said input and output terminals, and being operative to controllably attenuate the average voltage value sensed by said detector by an amount that produces said filtered DC power supply voltage for powering said signaling circuit, and in which said unwanted AC component variation has been effectively removed.

18. The apparatus according to claim 17, wherein said signaling circuit comprises a subscriber line interface circuit (SLIC) coupled to tip and ring conductors of a telecommunication wireline pair, to which said input terminals are coupled, and wherein said unwanted AC component includes a ringing signal.

19. The apparatus according to claim 17, wherein said controllable attenuator comprises a controlled impedance coupled between said input and output terminals, and being operative to provide a controlled voltage drop thereacross based upon said average voltage value sensed by said detector, that accommodates a maximum amplitude of said unwanted AC component of said DC power supply voltage.

20. The apparatus according to claim 19, wherein said controlled impedance has a current flow path therethrough coupled between said input and output terminals, and a control terminal for controlling the impedance of said current flow path, and an error amplifier circuit having an output terminal coupled to said control terminal of said controlled impedance, a first input coupled to said detector, and a second input coupled to said output terminals.

21. The apparatus according to claim 20, wherein said error amplifier circuit includes a differentially coupled pair of first and second transistors having current inputs thereof coupled to a reference potential terminal, said first transistor having a control terminal thereof coupled to said detector, and an output coupled to the control terminal of said controlled impedance, said second transistor having a control terminal thereof coupled to an output voltage sensor coupled to said output terminals, and an output coupled to the output of said controlled impedance.

22. The apparatus according to claim 21, further including a current limiting circuit coupled with said controlled impedance and being operative to controllably limit drive to said control terminal thereof in accordance with current flow between said input and output terminals.

23. The apparatus according to claim 21, wherein said detector comprises a low pass filter coupled in circuit with a first voltage divider, and being operative couple a scaled version of said average voltage value of low frequency variation of said DC power supply voltage to said control terminal of said first transistor, and wherein said output voltage sensor includes a second voltage divider that is operative couple a scaled version of said filtered DC power supply voltage to said control terminal of said second transistor.

24. The apparatus according to claim 23, further including a current limiting circuit coupled with said controlled impedance, and being operative to controllably limit drive to said control terminal thereof in accordance with current flow between said input and output terminals.

25. The apparatus according to claim 24, wherein said low pass filter includes a capacitor, and wherein a controlled discharge device is coupled to said capacitor and is operative to controllably discharge said capacitor in accordance with said current flow between said input and output terminals.

* * * * *